US012086366B1

(12) United States Patent
Kothapally et al.

(10) Patent No.: US 12,086,366 B1
(45) Date of Patent: Sep. 10, 2024

(54) MULTI-COLOR STYLUS FOR MUTUAL CAPACITANCE TOUCH SCREEN DEVICES

(71) Applicant: International Business Machines Corporation, Armonk, NY (US)

(72) Inventors: Madhu Pavan Kothapally, Warangal (IN); Namrata Kumari, Jamshedpur (IN); Narinder Kaur, Ludhiana (IN); Ray Anderson, Decatur, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/118,647

(22) Filed: Mar. 7, 2023

(51) Int. Cl.
  *G06F 3/044* (2006.01)
  *G06F 3/02* (2006.01)
  *G06F 3/0354* (2013.01)
  *G06F 3/038* (2013.01)

(52) U.S. Cl.
  CPC .............. *G06F 3/0442* (2019.05); *G06F 3/02* (2013.01); *G06F 3/03545* (2013.01); *G06F 3/0383* (2013.01)

(58) Field of Classification Search
  CPC .................................................. G06F 3/0442
  See application file for complete search history.

(56) References Cited

U.S. PATENT DOCUMENTS

| 5,488,204 | A | 1/1996 | Mead et al. |
| 5,959,616 | A | 9/1999 | Challener |
| 9,778,761 | B2 | 10/2017 | Katsurahira |
| 11,126,281 | B2 | 9/2021 | Lewty et al. |
| 11,137,840 | B1 | 10/2021 | Han et al. |
| 11,360,582 | B2 | 6/2022 | Bell |
| 2009/0146975 | A1* | 6/2009 | Chang ................. G06F 3/03545 345/179 |
| 2009/0211821 | A1 | 8/2009 | Yeh et al. |
| 2020/0225778 | A1* | 7/2020 | Lewty ................. G06F 3/04883 |
| 2021/0208705 | A1* | 7/2021 | Bell ...................... G06F 3/0446 |
| 2022/0026998 | A1* | 1/2022 | Zimmerman ......... G06F 3/0416 |

FOREIGN PATENT DOCUMENTS

CN          102915127 A      2/2013

OTHER PUBLICATIONS

Colorpik Digital Ink Pen YouTube video https://www.youtube.com/watch?v=xwkvpTZuh78 (Year: 2022).*
Introducing Scribble—The world's first color picker pen & stylus YouTube video https://www.youtube.com/watch?v=y2aJuulsots (Year: 2015).*

* cited by examiner

*Primary Examiner* — Chun-Nan Lin
(74) *Attorney, Agent, or Firm* — Zilka-Kotab, P.C.

(57) ABSTRACT

A stylus, in accordance with one embodiment, includes an elongated body having an input mechanism for receiving user selection of a color to be output upon interaction of the stylus with a computing device. The stylus also includes a nib functional as a transmitting unit to publish the selected color to a receiver of the computing device when the nib is in contact and/or near contact with the receiver. A computer-implemented method for synchronizing a stylus having color selection to a computing device, in accordance with one embodiment, includes outputting a request to a user to select a color on the stylus and touch the stylus to a receiver of the computing device. Touch of the stylus to the receiver of the computing device is detected. A capacitance of the stylus is calculated. The capacitance of the stylus is stored in association with the color.

17 Claims, 8 Drawing Sheets

MULTI-COLOR STYLUS FOR MUTUAL CAPACITANCE TOUCH SCREEN DEVICES

BACKGROUND

The present invention relates to styluses, and more specifically, this invention relates to styluses having integrated color selection capability.

A touch-based electronic device can be used to interact with and provide input to computers and other touch-sensitive devices. Some touch-based computers and track-pads can accept input from a stylus. For example, some devices allow a user to draw on the display and/or select items on the display with a tap. Use of a stylus provides a more precise user input than a finger, as the surface area of the point of contact of a stylus is smaller than that of a finger.

SUMMARY

A stylus, in accordance with one embodiment, includes an elongated body having an input mechanism for receiving user selection of a color to be output upon interaction of the stylus with a computing device. The stylus also includes a nib functional as a transmitting unit to publish the selected color to a receiver of the computing device when the nib is in contact and/or near contact with the receiver.

A computer-implemented method for synchronizing a stylus having color selection to a computing device, in accordance with one embodiment, includes outputting a request to a user to select a color on the stylus and touch the stylus to a receiver of the computing device. Touch of the stylus to the receiver of the computing device is detected. A capacitance of the stylus is calculated. The capacitance of the stylus is stored in association with the color.

A computer-implemented method for detecting a stylus-selected color change, in accordance with one embodiment, includes detecting touch of a stylus to a receiver of a computing device. In response to detecting the touch, an effective capacitance at about a site of the touch is calculated. The calculated effective capacitance is compared to a previous effective capacitance. In response to the calculated effective capacitance not matching the previous effective capacitance, a capacitance of the stylus is calculated using the effective capacitance and a capacitance of the receiver. A color corresponding to the calculated capacitance of the stylus is received. An application is instructed to change to the retrieved color.

Other aspects and embodiments of the present invention will become apparent from the following detailed description, which, when taken in conjunction with the drawings, illustrate by way of example the principles of the invention.

DETAILED DESCRIPTION

Figure 1:
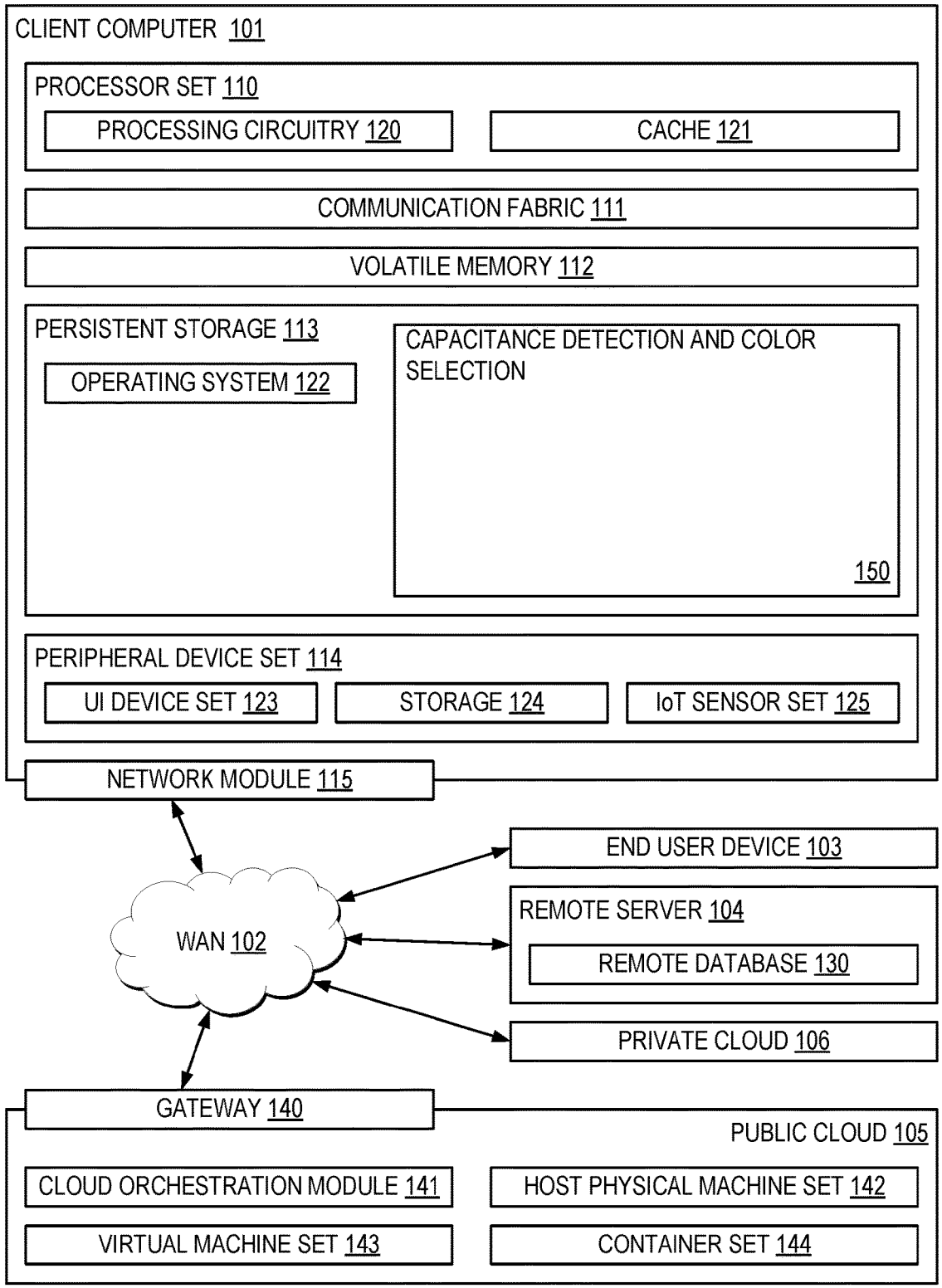
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of styluses that allow selection of color, as well as computing devices compatible with such styluses. Methods of synchronizing a stylus to the computing device, as well as detecting color change are also presented.

In one general embodiment, as stylus includes an elongated body having an input mechanism for receiving user selection of a color to be output upon interaction of the stylus with a computing device. The stylus also includes a nib functional as a transmitting unit to publish the selected color to a receiver of the computing device when the nib is in contact and/or near contact with the receiver.

In another general embodiment, a computer-implemented method for synchronizing a stylus having color selection to a computing device includes outputting a request to a user to select a color on the stylus and touch the stylus to a receiver of the computing device. Touch of the stylus to the receiver of the computing device is detected. A capacitance of the stylus is calculated. The capacitance of the stylus is stored in association with the color.

In another general embodiment, a computer-implemented method for detecting a stylus-selected color change includes detecting the touch of a stylus to a receiver of a computing device. In response to detecting the touch, an effective capacitance at about a site of the touch is calculated. The calculated effective capacitance is compared to a previous effective capacitance. In response to the calculated effective capacitance not matching the previous effective capacitance, a capacitance of the stylus is calculated using the effective capacitance and a capacitance of the receiver. A color corresponding to the calculated capacitance of the stylus is received. An application is instructed to change to the retrieved color.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code for detecting a capacitance level of a stylus point and selecting a color level based thereon in block 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As noted above, a stylus may be used to interact with a touch screen device. Known styluses enable only a single-touch event. Moreover, prior to the present invention, use of a stylus to change colors on the screen was severely limited. For example, when a user was taking handwritten notes or drawing an art form, it was difficult to change the color of the output on the display corresponding to the touch of the stylus. Changing the color was only possible with the help of on-screen controls and color pallets, via a tedious process of moving from the current writing location to hovering over the color pallet, then selecting the color by touching the reference, and then returning to the writing location.

Returning to the example of a user taking handwritten notes while attending a class, during the class, assume the user wants to make note of an important section to revisit, action items to work on after the class, highlight the conclusions of the class, etc. For each of these categories of notes, the user would prefer to use a different color representation. Each time the user wants to switch colors, however, the user needs to select the color from the color pallet output on the display. The color pallet takes up precious space on the screen, may be behind the current window being viewed and thus needs to be found and moved to the top for selection of a color, etc.

To further highlight the problem, in a post-sports match commentary, assume the commentator is depicting the game plan of scoring a goal, by explaining the movements of players from both teams. In this case, the commentator wants to use different colors for each team's player movements. Each time the commentator wants to switch colors, the color has to be selected from the color pallet. Unfortunately, the color pallet will block the game screen, and multiple color switches between the commentary impede the natural flow of the commentary.

Various embodiments of the present invention include a stylus, also referred to as a stylus pen, as a peripheral device usable to generate a touch event on a mutual capacitance touch screen of a computational device of any type, such as a tablet, mobile phone, laptop computer, touch-enabled computer monitor, point of sale screen, etc. Presented herein is a new multi-color stylus that can act as a multi-categorial touch event generator. The disclosed stylus implementation is capable of generating multiple events for color selection based on the color selection made directly on the stylus itself. Moreover, the stylus preferably has a low latency response for an application. Thus, the styluses described herein overcome the aforementioned drawbacks in the state of the art by providing multi-color styluses which are able to communicate the different color usages without any additional communication medium. Such a stylus greatly improves the user experience when a frequent color change is desired.

Figure 2:
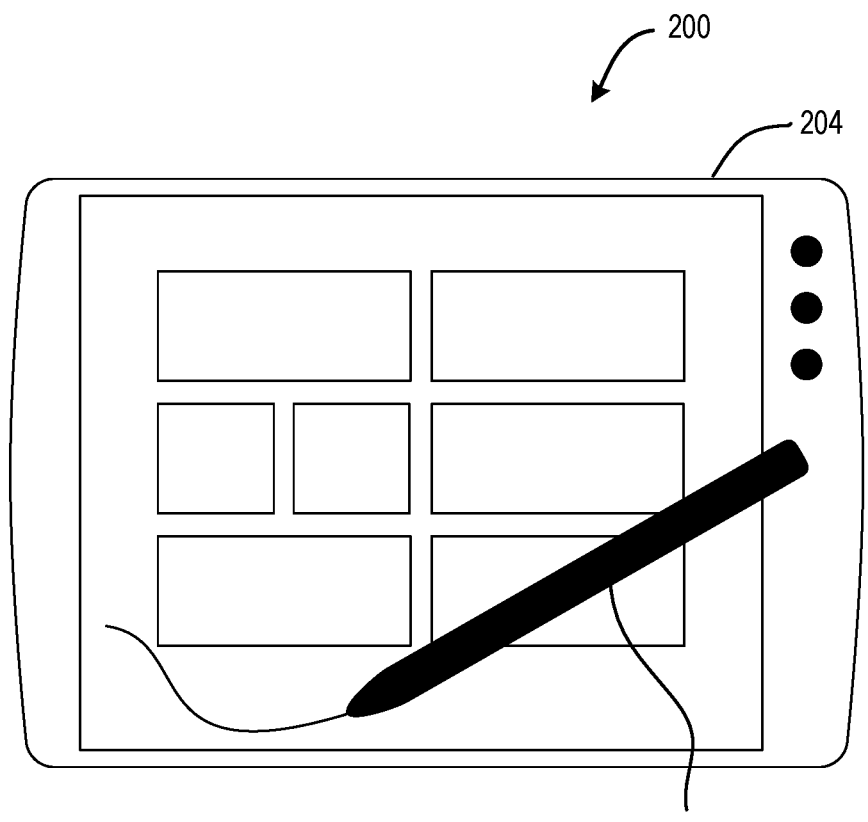
FIG. 2 depicts a system, in accordance with one embodiment.
Figure 3:
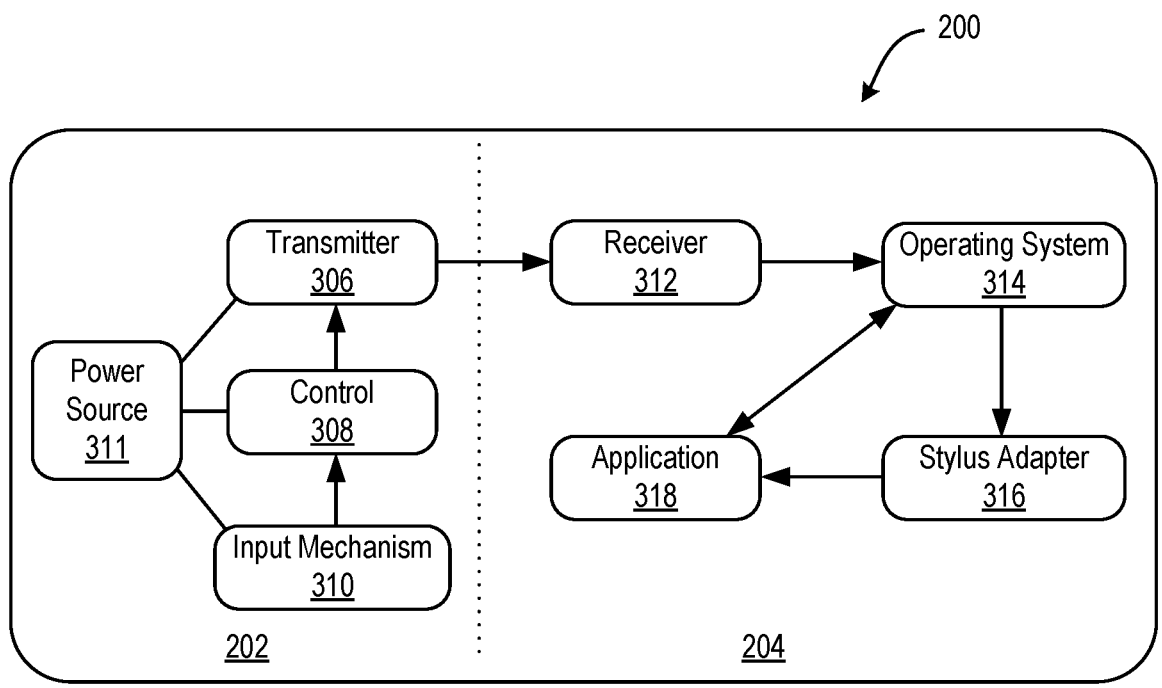
FIG. 3 depicts the system of FIG. 2, in accordance with one embodiment.

FIGS. 2 and 3 depict a system 200, in accordance with one embodiment. As an option, the present system 200 may be implemented in conjunction with features from any other embodiment listed herein, such as those described with reference to the other FIGS. Of course, however, such system 200 and others presented herein may be used in various applications and/or in permutations which may or may not be specifically described in the illustrative embodiments listed herein. Further, the system 200 presented herein may be used in any desired environment.

In various embodiments, the hardware components of the system 200 may include a device having one or more processors therein. The processor, e.g., processing circuit(s), chip(s), and/or module(s) implemented in hardware and/or software, and preferably having at least one hardware component, may be utilized to perform the methodology described herein for each hardware component. Illustrative processors include, but are not limited to, a central processing unit (CPU), an application specific integrated circuit (ASIC), a field programmable gate array (FPGA), etc., combinations thereof, or any other suitable computing device known in the art.

As shown in FIGS. 2 and 3, the system includes a stylus 202 and a computing device 204. The stylus may include a transmitter 306 for communicating with the touch screen device. The transmitter 306 may include any known components that would become apparent to one skilled in the art after reading the present disclosure. A control circuit 308 controls the signal transmitted by the transmitter, preferably under control of a user input mechanism 310 of the stylus 202. The stylus 202 may also include a power source 311 of any known type, such as a rechargeable battery, or equivalently a receiving area for a power source such as disposable batteries.

The computing device 204 includes a receiver 312, e.g., a touch screen, touchpad, trackpad, etc. having a capacitive sensor. The receiver 312 is controlled by an operating system 314. The operating system 314 is in communication with a stylus adapter 316 that is used to characterize input from the stylus 202, such as for synchronizing the stylus to the receiver 312. The operating system 314 and stylus adapter 316 may be implemented in software, firmware and/or hardware. The operating system 314 is also in communication with an application 318, such as a word processing application, web browser, notepad, etc. that is being interacted with by the user via the stylus 202. The stylus adapter 316 and/or the application 318 may correlate stylus input with a change in color, e.g., by correlating the input from the stylus 202 with selection of a color. For example, the input can be correlated to a table of inputs and corresponding color. The color selection may be applied to output of the application in any desired manner that would become apparent to one skilled in the art after reading the present disclosure. For example, a color may be overlaid over the output of the application 318, e.g., as highlighting, as a drawn line, etc. In another approach, the color may be applied to the output of the application, such as by changing the color of an image or text in the output. In yet another approach, the movement of the stylus is transduced into output, e.g., such as handwriting, etc.

In one example of use, assume a user is taking handwritten notes on a tablet. As the user needs precise input for handwriting, the user is using a stylus pen 202, according to an illustrative embodiment. The stylus pen 202 includes an input mechanism 310 that can be used to configure different color representations. As a result, the user is now able to quickly switch between colors for handwriting, highlighting, color change of a graphic, etc. by selecting different colors using the input mechanism 310 provided on the stylus 202.

Figure 4:
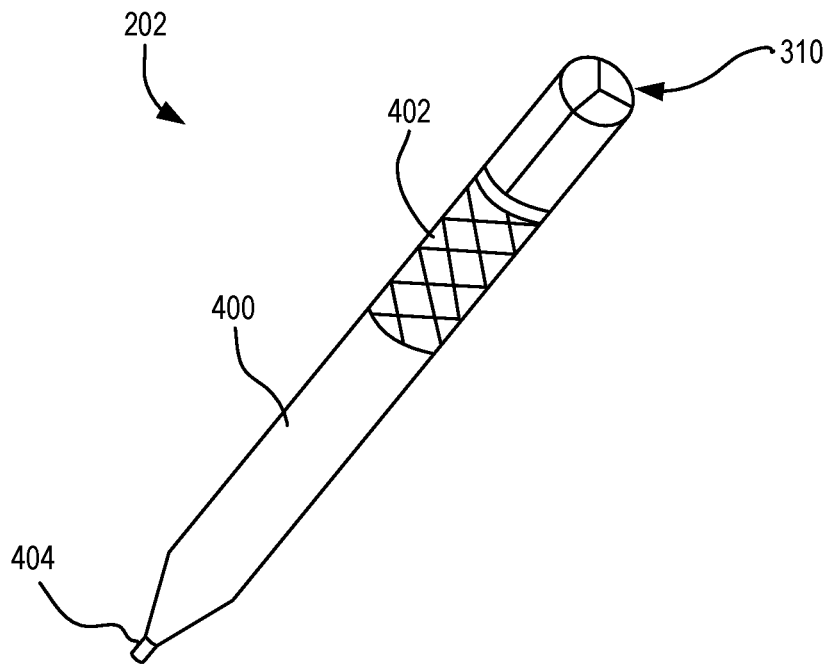
FIG. 4 depicts a stylus, in accordance with one embodiment.

FIG. 4 depicts a stylus 202, in accordance with one embodiment. As an option, the present stylus 202 may be implemented in conjunction with features from any other embodiment listed herein, such as those described with reference to the other FIGS. Of course, however, such stylus 202 and others presented herein may be used in various applications and/or in permutations which may or may not be specifically described in the illustrative embodiments listed herein. Further, the stylus 202 presented herein may be used in any desired environment.

The stylus 202 includes an elongated body 400 having an input mechanism 310 for receiving user selection of a color to be output upon interaction of the stylus 202 with a computing device. The stylus 202 may also include a display unit 402 that provides an indication of a color selected by the input mechanism 310.

The input mechanism 310 may include any type of input mechanism that would become apparent to one skilled in the art after reading the present disclosure. In some approaches, the input mechanism includes one or more buttons, where each button may correspond to a different color. In another approach, the input mechanism 310 may include a dial. And in yet another approach, the input mechanism 310 may include a touch pad. Preferably, the input mechanism 310 is positioned at a distal end of the body of the stylus 202 to prevent accidental change of a color selection, to allow viewing of the selected color via the display unit 402, etc.

In one approach, a single button is used to cycle through different color schemes. In preferred approaches, a combination of buttons are used to allow selecting of a given input. In the embodiment shown, three buttons are provided, one for red, one for green and one for blue, whereby a combination of actuation of these buttons represents a color generated by mixing the aforementioned primary colors. Thus, a desired color is selectable by manipulating the buttons. For instance, selection of the red button may correspond to a red color being output on the touch screen when the stylus is used. Selection of the red and blue buttons may correspond to a purple color being output on the touch screen when the stylus is used. Moreover, the buttons may allow a more granular selection of colors, such as by allowing selection of shades of each color according to a number of presses on the button.

In some approaches, if no input is received by the input mechanism 310, e.g., if none of the buttons are selected, the default color is selected by the application 318.

In preferred embodiments, the display unit 402 includes a visual display of known type such as a liquid crystal display (LCD) screen or the like to represent the chosen input. The display unit 402 may show the actual color selected, may show text describing the color, may show a graph with selected levels of primary colors, etc. Preferably, the display unit 402 is positioned on the upper half of the stylus pen so that the hand of a user holding the stylus pen does not block the display while selecting the input using the input mechanism 310.

A nib 404 may be positioned at the tip of the stylus 202. The nib 404 may function as a transmitting unit to publish the selected color to the receiver 312, e.g., touch screen, trackpad, etc., of the computing device when the nib is in contact and/or near contact with the receiver. In some approaches, the nib 404 is clickable, whereby the nib 404 is clicked when the stylus is pressed onto the receiver 312 such that the stylus 202 only sends information to the receiver 312 when the stylus is in contact with the receiver 312.

The internal design of the stylus 202 may include components that enable use of the aforementioned input mechanism 310, display unit 402, and nib 404. Any internal components, and their configuration, that would become apparent to one skilled in the art after reading the present disclosure may be used. Such components may be of a type known in the art, but specifically selected, modified and/or combined to create the new and novel combinations of features according to the teachings presented herein.

In a preferred embodiment, the internal design includes one or more components selected from the group consisting of: a power source such as a battery or equivalently a receiving area for a battery; a battery charging voltage regulator to enable battery charging if the stylus uses rechargeable batteries; a capacitor voltage charging point of load (POL) voltage regulator (VR); a variable capacitor, preferably a class II (ferroelectric, e.g., multilayer ceramic) capacitor coupled to the nib, e.g., integrated into the nib or in electrical communication therewith; a low pass filter comprised of an inductor and a bulk electrolytic capacitor; a variable resistor (potentiometer, etc.), and control circuitry coupled to some or all of the foregoing components as well as the input mechanism 310, display unit 402, and/or nib 404.

Figure 5:
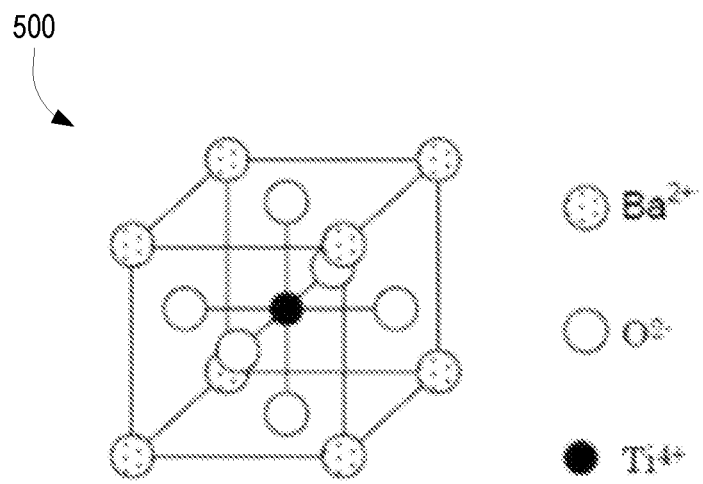
FIG. 5 depicts the crystal structure of ceramic $BaTiO_3$.
Figure 6:
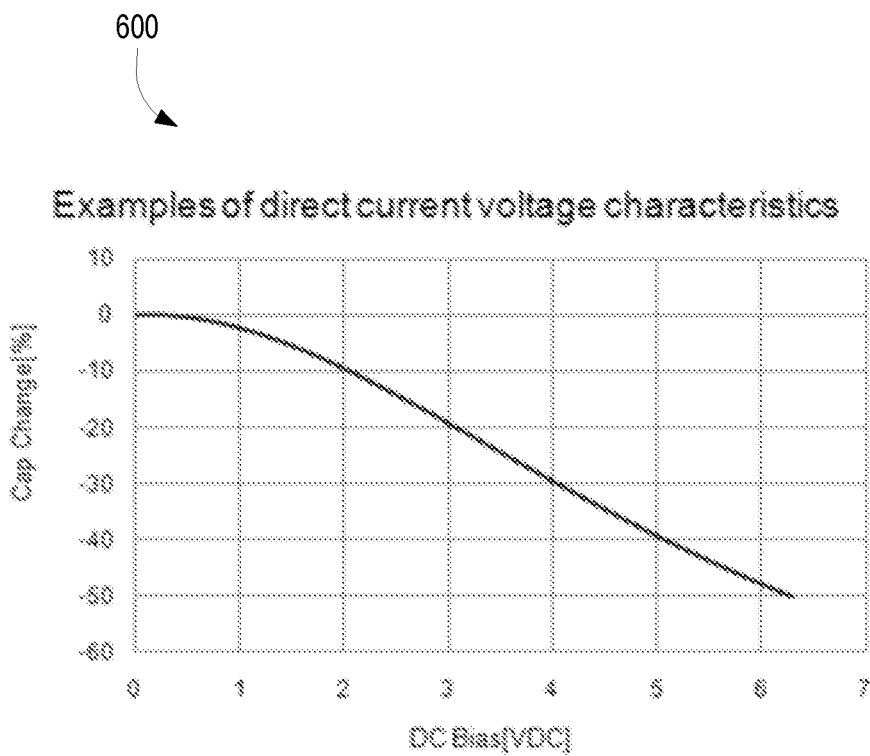
FIG. 6 depicts an exemplary graph of capacitance change due to a change in direct current bias voltage.

In particularly preferred embodiments, a class II multilayer ceramic capacitor (MLCC) is strategically chosen for its functionality as a variable capacitor. Namely, due to having a ferroelectric dielectric (e.g., $BaTiO_3$), its crystalline structure 500, shown in FIG. 5, has a shift of the Ti4+ ion crystal during polarization due to voltage biasing. This effect is amplified based on voltage bias. Upon receiving voltage biasing, the electric field polarizes the crystal in the direction of the biasing. Thus, the capacitance changes based on voltage bias applied to the class II capacitor. FIG. 6 depicts an exemplary graph 600 of capacitance change due to a change in direct current bias voltage.

The power source of the stylus provides a supply voltage for the point of load voltage regulator. The variable resistor, which may be a potentiometer or rheostat, may be connected to a feedback pin, which in some approaches connects a non-inverting amplifier configuration inside the voltage regulator. This pin may be connected to the voltage output, e.g., downstream of the POL filter capacitor, and depending on the resistive network, it will create varying bias voltage levels.

The low pass filter inductor and capacitor may be connected to the switch node of the POL VR to filter out switching signal between the supply rail (VDD) and ground (GND).

The multi-color styluses described herein are intended to be operable on wide varieties of mutual capacitance based touch screen devices. Illustrative mutual capacitance touch screen devices include, but are not limited to, mobile phones, tablets, external trackpad, touch screen laptops, touch screen TVs, etc. Because these computing devices typically have a different receiver sensor capacitance (Cs), manual synchronization (sync) may be performed for the first use of the multi-color stylus pen. Moreover, the capacitance of the receiver and/or stylus might change over time, especially over years of use. Therefore, a resync may be performed when there is a change in stylus and/or receiver sensor capacitance. Changes in the receiver sensor capacitance can be identified by checking the receiver sensor capacitance, e.g., periodically; upon occurrence of an event such as receipt of a user request, failure to properly detect the stylus; etc.

Figure 7:
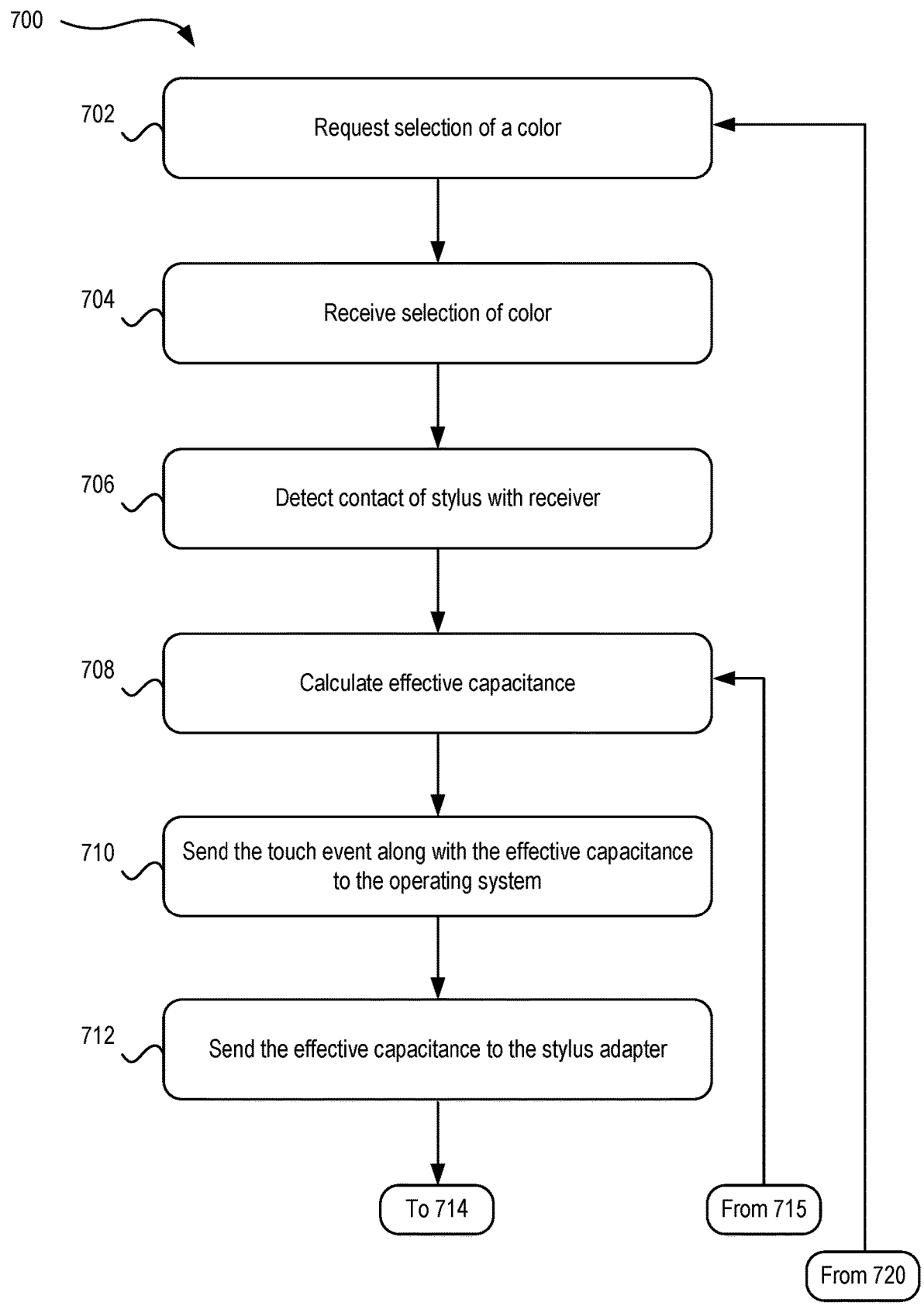
FIG. 7 is a flowchart of a method, in accordance with one embodiment.
Figure 7:
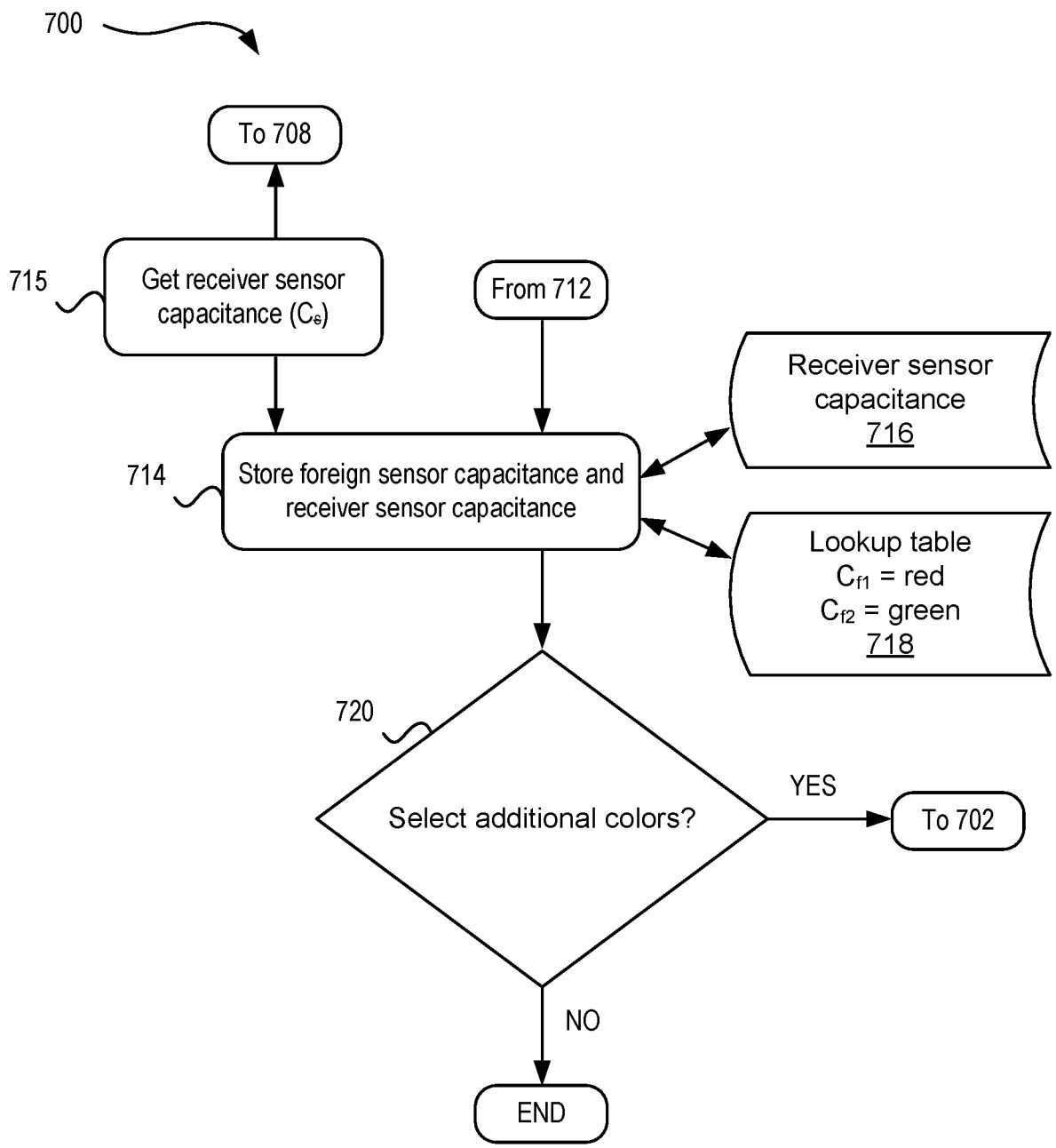

Now referring to FIG. 7, a flowchart of a method 700 is shown, according to one embodiment. The method 700 may be performed in accordance with the present invention any of the environments depicted in FIGS. 1-6, among others, in various embodiments. Of course, more or fewer operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a computing device, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a request is output on the screen of the computing device and/or display of the stylus, asking a user to select a color, e.g., a particular color, any color, a particular color sequence, etc.

In operation 704, the selection of the color is received by the stylus via user manipulation of the input mechanism, e.g., buttons.

In operation 706, the computing device detects contact or near contact of its receiver with the stylus.

In operation 708, the receiver of the computing device calculates the effective capacitance at about the site of the touch. The receiver may calculate the effective capacitance in some approaches, and may include the receiver capacitance in such a calculation.

In operation 710, the touch event along with the effective capacitance is sent to the operating system.

In operation 712, the operating system sends the effective capacitance to the stylus adapter.

In operation 714, the stylus adapter determines the foreign capacitance ($C_f$) of the stylus from the effective capacitance, and also may receive the receiver sensor capacitance $C_s$. See operation 715. The stylus adapter stores the receiver sensor capacitance $C_s$ 716 and the foreign capacitance ($C_f$) 718 of the stylus with the associated color, e.g., in a lookup table in memory. In some approaches, the effective capacitance received by the stylus adapter is the sum of the receiver sensor capacitance ($C_s$) and the foreign capacitance ($C_f$). Accordingly, the stylus adapter may store the receiver sensor capacitance and maintain a lookup table 718 for each color representation matching to the foreign capacitance.

For finer tuning of the communication between the stylus and the receiver, two or more unique colors may be detected. See decision 720. The method 700 may return to operation 702 for the next and each subsequent color. In preferred embodiments, each of the primary colors (e.g., RGB) are synced.

In preferred approaches, the stylus transmits a unique capacitance for each chosen color input. This generates a unique effective capacitance at the receiver. Accordingly, in such approaches, the number of color combinations the stylus can represent is limited to the degree of uniquely distinguishable foreign capacitances the stylus (transmitter) can generate within an acceptable range of the receiving device.

Determining the color selected by the stylus at each touch event and notifying the application on each touch event would be expected to induce latency. To avoid this, preferred embodiments of the proposed system included a low latency color change process. The following method provides a preferred color change process.

Figure 8:
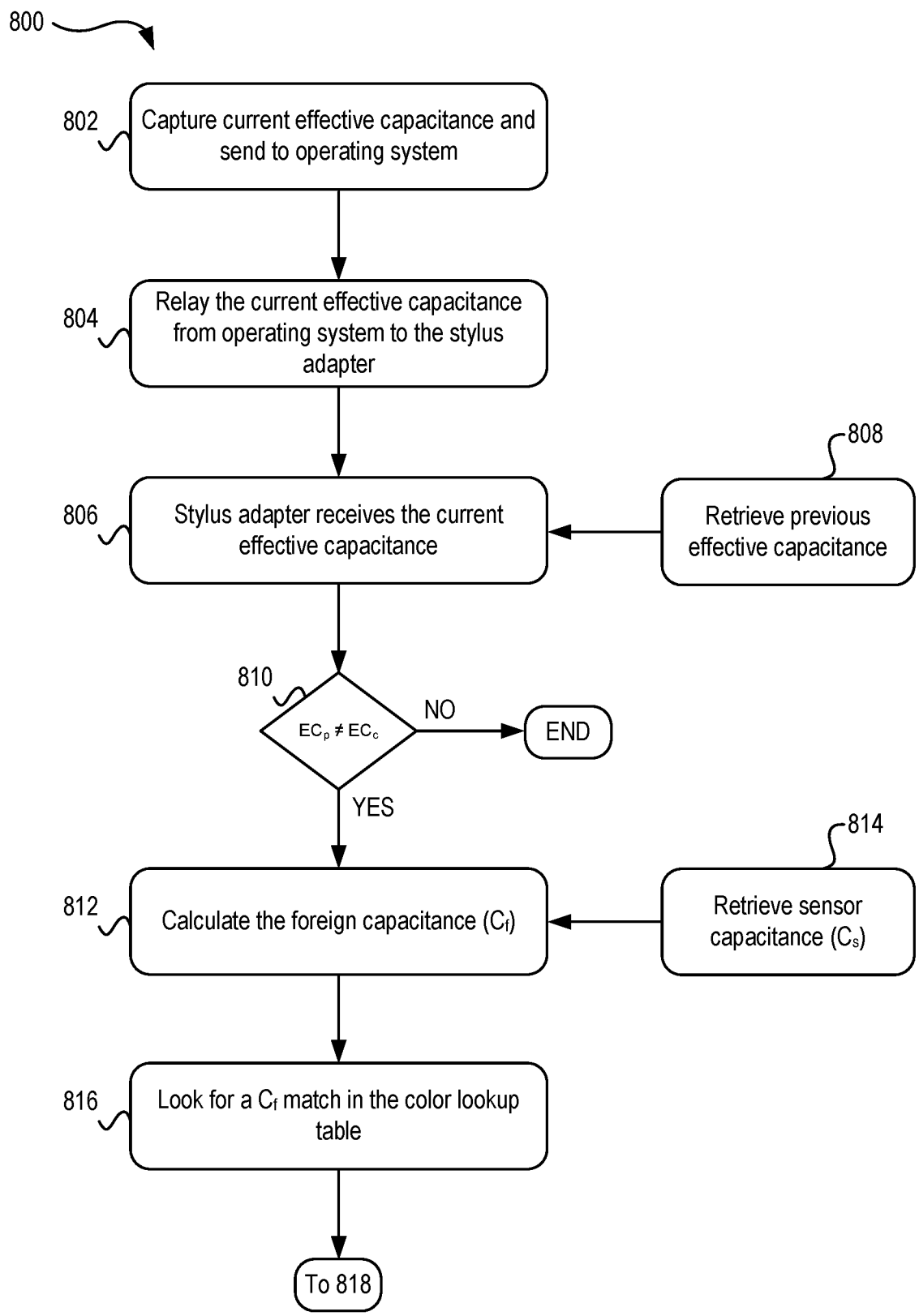
FIG. 8 is a flowchart of a method, in accordance with one embodiment.
Figure 8:
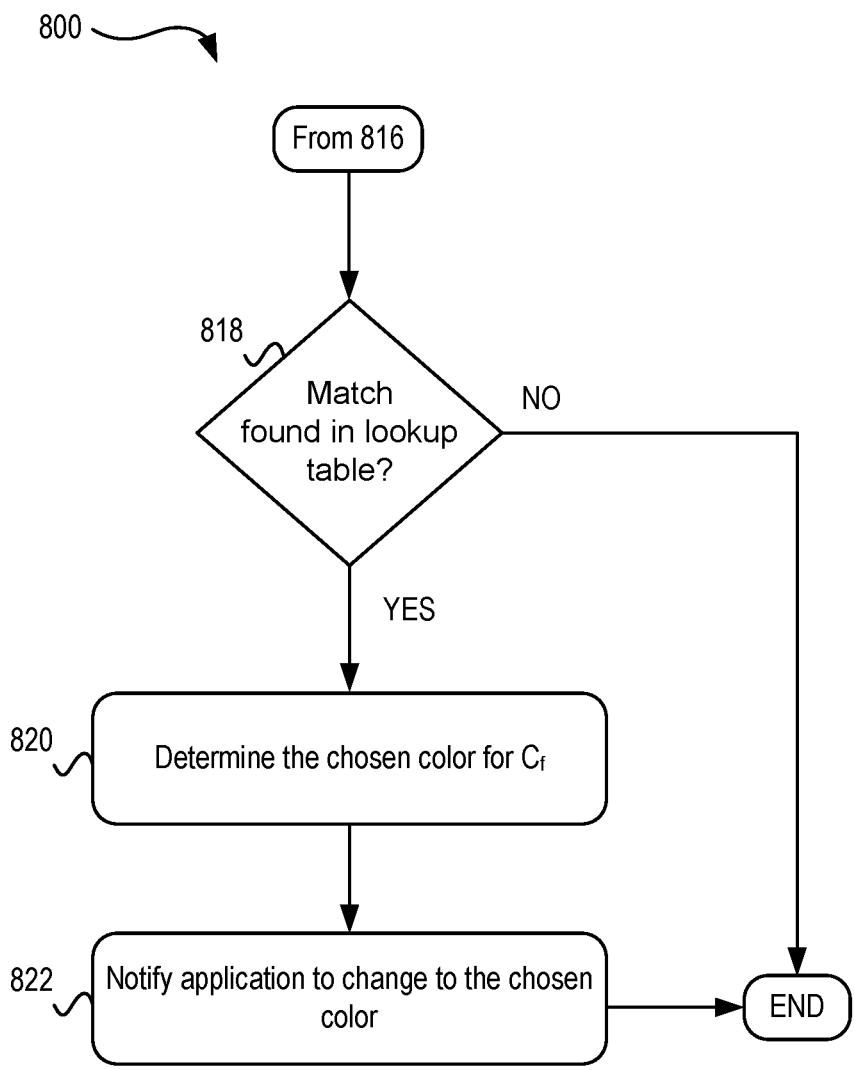

Now referring to FIG. 8, a flowchart of a method 800 is shown according to one embodiment. The method 800 may be performed in accordance with the present invention any of the environments depicted in FIGS. 1-7, among others, in various embodiments. Of course, more or fewer operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by the system presented herein, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where the receiver of the computing device captures the effective capacitance (EC) and sends the effective capacitance value to the operating system.

In operation 804, the operating system relays the effective capacitance to the stylus adapter.

In operation 806, the stylus adapter receives the current effective capacitance ($EC_c$), as well as the previous effective capacitance ($EC_p$). See operation 808.

At decision 810, the current effective capacitance ($EC_c$) is compared to the previous effective capacitance ($EC_p$). If the capacitances match, e.g., to within an acceptable range such as within 4% of one another, no change in color is detected, and so the stylus adapter does not interrupt the application. See the "No" path from decision 810.

If the capacitances do not match, indicating a change in capacitance of the stylus, the method proceeds to operation 812, where the stylus adapter calculates the foreign capacitance ($C_f$) of the stylus. The stylus adapter also receives the receiver sensor capacitance ($C_s$). See operation 814.

The stylus adapter selects the color corresponding to the stylus foreign capacitance ($C_f$) in operation 816, e.g., by finding a match for the foreign capacitance in the look up table correlating $C_f$ values to colors.

At decision 818, a determination is made as to whether a match was found in the look up table. If a match was found, the method continues to operation 820. If a match was not found, the method ends, upon which the color may not be changed, a default color may be selected, an error message is output, etc.

In operation 820, the chosen color is determined for the $C_f$ values. The application is notified to change output to the selected color in operation 822.

In some approaches, when an application which is compatible with use of the stylus has started, the stylus adapter is initialized in the background. The stylus adapter first validates the receiver sensor capacitance to be the same as expected from stored data. If there is a deviation in the stored receiver sensor capacitance and the actual capacitance, a resync of the stylus may be requested.

In particularly preferred approaches, applications directly listen to the touch event generated by the operating system without the interference of the stylus adapter. The operating system sends the touch event to the stylus adapter as well as to the application. The application is interrupted by the stylus adapter only when there is a change in color selection by the user, e.g., upon the effective capacitance changing, which correlates to a change in capacitance of the stylus. This will improve the overall usability of the device by maintaining low latency response at the application level.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A stylus, comprising:
   an elongated body having an input mechanism for receiving, by the stylus directly from a user, user selection of a color to be output on a screen of a computing device in response to interaction of the stylus with the computing device;
   a display unit in the elongated body for outputting an indication of the color selected via the input mechanism; and
   a nib functional as a transmitting unit to publish the selected color to a receiver of the computing device when the nib is in contact and/or near contact with the receiver of the computing device for causing the selected color to be output on the screen of the computing device.

2. The stylus of claim 1, wherein the display unit outputs the actual selected color.

3. The stylus of claim 1, wherein the indication of the selected color is selected from the group consisting of: text describing the color, and a graph having levels of primary colors.

4. The stylus of claim 1, wherein the input mechanism includes at least two buttons, each button corresponding to a different color.

5. The stylus of claim 1, comprising a variable capacitor coupled to the nib.

6. The stylus of claim 1, wherein the nib is configured to only send information to the computing device when the stylus is in contact with the computing device.

7. A system, comprising:
   the stylus of claim 1; and
   the computing device.

8. The system of claim 7, wherein the computing device has:
   a screen;
   the receiver with a capacitive sensor; and
   a stylus adapter configured to select a color for output by an application of the computing device on the screen of the computing device based on a change in capacitance of the stylus.

9. The system of claim 8, wherein the stylus adapter is configured to only interrupt the application in response to detecting the change in capacitance of the stylus.

10. The system of claim 7, wherein the computing device is configured to:
    output a request to a user requesting that the user select the color on the stylus and touch the stylus to the receiver of the computing device;
    detect touch of the stylus to the receiver of the computing device;
    calculate a capacitance of the stylus; and
    store the capacitance of the stylus in association with the color.

11. The system of claim 10, wherein the computing device is configured to calculate an effective capacitance at about a site of the touch, wherein the effective capacitance comprises a sum of the capacitance of the stylus and the capacitance of the receiver.

12. The system of claim 11, wherein a stylus adapter of the computing device receives the effective capacitance, calculates the capacitance of the stylus therefrom, and stores the calculated capacitance of the stylus in association with the color.

13. The system of claim 7, wherein the computing device is configured to:

detect touch of the stylus to the receiver of the computing device;

in response to detecting the touch, calculate an effective capacitance at about a site of the touch;

compare the calculated effective capacitance to a previous effective capacitance;

in response to the calculated effective capacitance not matching the previous effective capacitance, calculate a capacitance of the stylus using the effective capacitance and a capacitance of the receiver;

retrieve a color corresponding to the calculated capacitance of the stylus; and instruct an application to change to the retrieved color.

14. The system of claim 13, wherein the application is only interrupted in response to detecting the change in the effective capacitance.

15. A stylus, comprising:

an elongated body having an input mechanism for receiving user selection of a color to be output upon interaction of the stylus with a computing device, and a nib functional as a transmitting unit to publish the selected color to a receiver of the computing device when the nib is in contact and/or near contact with the receiver; and a variable capacitor coupled to the nib, wherein the variable capacitor is a class II multi-layer ceramic capacitor.

16. A system comprising:

a stylus comprising:

an elongated body having an input mechanism for receiving user selection of a color to be output upon interaction of the stylus with a computing device, and a nib functional as a transmitting unit to publish the selected color to a receiver of the computing device when the nib is in contact and/or near contact with the receiver; and a computing device having:

a receiver with a capacitive sensor; and a stylus adapter configured to select a color for output by an application of the computing device based on a change in capacitance of the stylus.

17. The system of claim 16, wherein the stylus adapter is configured to only interrupt the application in response to detecting the change in capacitance of the stylus.

* * * * *